(12) United States Patent
Thomas

(10) Patent No.: US 10,513,163 B2
(45) Date of Patent: *Dec. 24, 2019

(54) VEHICLE HEADREST THERMAL CONDITIONER

(71) Applicant: Gentherm Inc., Northville, MI (US)

(72) Inventor: David Scott Thomas, Royal Oak, MI (US)

(73) Assignee: Gentherm Inc., Northville, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/057,891

(22) Filed: Aug. 8, 2018

(65) Prior Publication Data

US 2019/0054796 A1    Feb. 21, 2019

Related U.S. Application Data

(63) Continuation of application No. 14/824,154, filed on Aug. 12, 2015, now Pat. No. 10,071,612.

(60) Provisional application No. 62/039,125, filed on Aug. 19, 2014.

(51) Int. Cl.
*B60H 1/00* (2006.01)
*B60N 2/80* (2018.01)
*B60N 2/56* (2006.01)

(52) U.S. Cl.
CPC ....... *B60H 1/00478* (2013.01); *B60N 2/5635* (2013.01); *B60N 2/5657* (2013.01); *B60N 2/5671* (2013.01); *B60N 2/5678* (2013.01); *B60N 2/5692* (2013.01); *B60N 2/80* (2018.02); *B60N 2002/899* (2018.02)

(58) Field of Classification Search
CPC ... B60H 1/00478; B60H 1/0028; F25B 21/04; F25B 21/02; F25B 2321/02; B60N 2/5634; B60N 2/5657; B60N 2/5678; B60N 2/5692; B60N 2002/4888
See application file for complete search history.

(56) References Cited

U.S. PATENT DOCUMENTS

| | | | |
|---|---|---|---|
| 1,471,168 | A | 10/1923 | Katz |
| 8,143,554 | B2 | 3/2012 | Lofy |
| 8,176,741 | B2 | 5/2012 | Kameyama |
| 8,256,236 | B2 | 9/2012 | Lofy |
| 8,434,314 | B2 | 5/2013 | Comiskey et al. |
| RE44,272 | E | 6/2013 | Bell |
| 8,505,320 | B2 | 8/2013 | Lofy |

(Continued)

FOREIGN PATENT DOCUMENTS

| | | |
|---|---|---|
| EP | 2113407 | 11/2009 |
| JP | H2-107353 U | 8/1990 |
| JP | 2007282919 A | 11/2007 |

OTHER PUBLICATIONS

Chinese Office Action/Search Report for Chinese Application No. 201510509716.9 dated May 2, 2018.

(Continued)

*Primary Examiner* — Brian M King
(74) *Attorney, Agent, or Firm* — Carlson, Gaskey & Olds, P.C.

(57) ABSTRACT

A seat thermal conditioning device includes a seat portion having a vent configured to provide conditioned air to a seat occupant neck area. A thermoelectric module is arranged in the seat portion. The thermoelectric module is configured to both heat and cool an air supply to provide the conditioned air.

11 Claims, 9 Drawing Sheets

(56) References Cited

U.S. PATENT DOCUMENTS

| | | | |
|---|---|---|---|
| 8,516,842 | B2 | 8/2013 | Petrovski |
| 8,575,518 | B2 | 11/2013 | Walsh |
| 2002/0017102 | A1* | 2/2002 | Bell .................. B60H 1/00471 62/3.7 |
| 2006/0059933 | A1 | 3/2006 | Axakov et al. |
| 2006/0175877 | A1 | 8/2006 | Alionte et al. |
| 2006/0273646 | A1* | 12/2006 | Comiskey ................ A47C 7/74 297/408 |
| 2008/0100101 | A1 | 5/2008 | Wolas |
| 2009/0134677 | A1 | 5/2009 | Maly et al. |
| 2012/0261399 | A1 | 10/2012 | Lofy |
| 2013/0086923 | A1 | 4/2013 | Petrovski et al. |
| 2013/0097777 | A1 | 4/2013 | Marquette et al. |
| 2014/0090829 | A1 | 4/2014 | Petrovski |
| 2014/0130516 | A1 | 5/2014 | Lofy |
| 2014/0197155 | A1 | 7/2014 | Takahashi et al. |

OTHER PUBLICATIONS

Tabei, Koichi, "Development of a S-FLOW system and control (S-FLOW: Energy Saving Air Flow Control System)," SAE International, Apr. 8, 2013, pp. 1-9.
Barr, Michael, "Introduction to Pulse Width Modulation (PWM)," Embedded Systems Programming, Sep. 1, 2001, pp. 103-104.
Tomczyk, J., "Meet the Positive Temperature Coefficient Resistor," ACHR News, Jun. 29, 2002.
Freiburger, David, "How to Re-cover Seats," Hot Rod, Mar. 1, 1999.
Japanese Office Action for Japanese Application No. 2015-161477 dated May 16, 2019.

\* cited by examiner

VEHICLE HEADREST THERMAL CONDITIONER

CROSS-REFERENCE TO RELATED APPLICATIONS

This application is a continuation of U.S. patent application Ser. No. 14/824,154 filed Aug. 12, 2015, which claims priority to U.S. Provisional Application No. 62/039,125, which was filed on Aug. 19, 2014 and is incorporated herein by reference.

BACKGROUND

This disclosure relates to a vehicle headrest thermal conditioner. The thermal conditioner both heats and cools a supply air to provide conditioned air to a neck area of an occupant.

Vehicle manufacturers have increasingly included features to improve comfort of the vehicle occupant. One such feature has provided heated air to a neck area of the occupant through a headrest of the vehicle seat. In one arrangement, a backside of the headrest includes a large opening through an aesthetic cover. Supply air is pulled through the large opening to be heated by a PTC heating element. Heated air is delivered through a vent in a forward facing surface of the headrest.

SUMMARY

In one exemplary embodiment, a seat thermal conditioning device includes a seat portion having a vent configured to provide conditioned air to a seat occupant neck area. A thermoelectric module is arranged in the seat portion. The thermoelectric module is configured to both heat and cool an air supply to provide the conditioned air.

In a further embodiment of the above, the seat portion includes a housing that provides a passage including a fluid inlet and first and second fluid outlets. The first fluid outlet provides the vent.

In a further embodiment of any of the above, the thermoelectric module is arranged in the passage between the fluid inlet and the first and second fluid outlets.

In a further embodiment of any of the above, a blower is located in the housing and is configured to move fluid from the fluid inlet through the thermoelectric module to the first and second fluid outlets.

In a further embodiment of any of the above, the seat portion includes an occupant support surface. The first fluid outlet is located in the occupant support surface and is configured to provide conditioned air to the seat occupant neck area. The second fluid outlet is located in an area remote from the occupant support surface and is configured to direct waste air away from the seat occupant neck area.

In a further embodiment of any of the above, the seat portion includes a core, and a cushion member is arranged about the core. The thermal conditioning module is supported relative to the core. An aesthetic cover is wrapped about the core, the cushion member and the thermal conditioning device.

In a further embodiment of any of the above, the aesthetic cover includes a head support surface and first and second flaps operatively secured to one another at a bottom of the seat portion. A first fluid outlet provides the vent and is provided in the head support surface to provide the conditioned air to the occupant neck area. A second fluid outlet is provided in the bottom near each of the first and second flaps and is configured to exhaust waste air in a direction away from the occupant neck area.

In a further embodiment of any of the above, the thermoelectric module includes a thermoelectric device including a main side and a waste side. The thermoelectric device is configured to provide heating and cooling at the main side, respectively, in a heating mode and a cooling mode based upon a direction of current flow through the thermoelectric device. The main and waste side heat exchangers are provided on the main and waste sides, respectively.

In a further embodiment of any of the above, the thermoelectric device includes a heating element mounted to the main side heat exchanger. The heating element is configured to supply heat to the main side heat exchanger in a heating mode.

In another exemplary embodiment, a thermal conditioning device for a seat includes a housing that provides a passage including a fluid inlet and first and second fluid outlets. A thermoelectric module is arranged in the passage between the fluid inlet and the first and second fluid outlets. A blower is located in the housing and is configured to move fluid from the fluid inlet through the thermoelectric module to the first and second fluid outlets. The first fluid outlet is configured to be located at an occupant support surface and is configured to provide conditioned air to a seat occupant neck area. The second fluid outlet is located in an area remote from the occupant support surface and is configured to direct waste air away from the seat occupant neck area.

In a further embodiment of any of the above, the passage is L-shaped and the blower is arranged at one end of the passage.

In a further embodiment of any of the above, the second fluid outlet is provided by laterally spaced apart exhaust vents that include dividers canted aftward and are configured to direct waste air laterally and rearward away from the first fluid outlet.

In a further embodiment of any of the above, the fluid inlet and the first fluid outlet are fluidly connected by an elbow that is bent at an acute angle.

In a further embodiment of any of the above, the housing is provided by first and second housing portions that separate the first and second fluid outlets from one another.

In a further embodiment of any of the above, the first fluid outlet includes a vent slidably received within the first housing portion and is configured to capture an aesthetic cover between the vent and the first housing portion.

In another exemplary embodiment, a seat headrest assembly includes a core supported by a post at a bottom of the assembly. A cushion member is arranged about the core. A thermal conditioning device is supported relative to the core. An aesthetic cover is wrapped about the core, the cushion member and the thermal conditioning device. The aesthetic cover includes a head support surface and first and second flaps operatively secured to one another at a bottom of the assembly. A first fluid outlet provided in the head support surface is configured to provide conditioned air to an occupant neck area. A second fluid outlet is provided in the bottom near the first and second flaps and is configured to exhaust waste air in a direction away from the occupant neck area.

In a further embodiment of any of the above, the cushion member includes an aperture that provides a perimeter defining a cavity. The thermal conditioning device includes a blower that is arranged in the cavity. At least one of the flaps includes a hole that is in fluid communication with the cavity and is configured to provide supply air to the thermal conditioning device via the blower.

In a further embodiment of any of the above, the hole is arranged in between the posts.

In a further embodiment of any of the above, the first and second flaps are connected at a seam. The second fluid outlet is provided by spaced apart exhaust vents arranged at opposing ends of the seam.

In a further embodiment of any of the above, the first fluid outlet includes a vent slidably received within a housing within which the thermal conditioning device is arranged. The vent and the housing capture the aesthetic cover between one another.

In another exemplary embodiment, a thermoelectric module includes a thermoelectric device including a main side and a waste side. The thermoelectric device is configured to provide heating and cooling at the main side, respectively, in a heating mode and a cooling mode based upon a direction of current flow through the thermoelectric device. Main and waste side heat exchangers are provided on the main and waste sides, respectively. A heating element is mounted to the main side heat exchanger. The heating element is configured to supply heat to the main side heat exchanger in a heating mode.

In a further embodiment of any of the above, the thermoelectric device is configured to provide the Peltier effect.

In a further embodiment of any of the above, the heating element is a PTC heating element.

In a further embodiment of any of the above, there is a circuit that is configured to control a direction of current through the thermoelectric device to provide the heating and cooling modes. The circuit is responsive to at least one switch.

In a further embodiment of any of the above, the heating element includes a resistive heating element and a PWM modulator.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
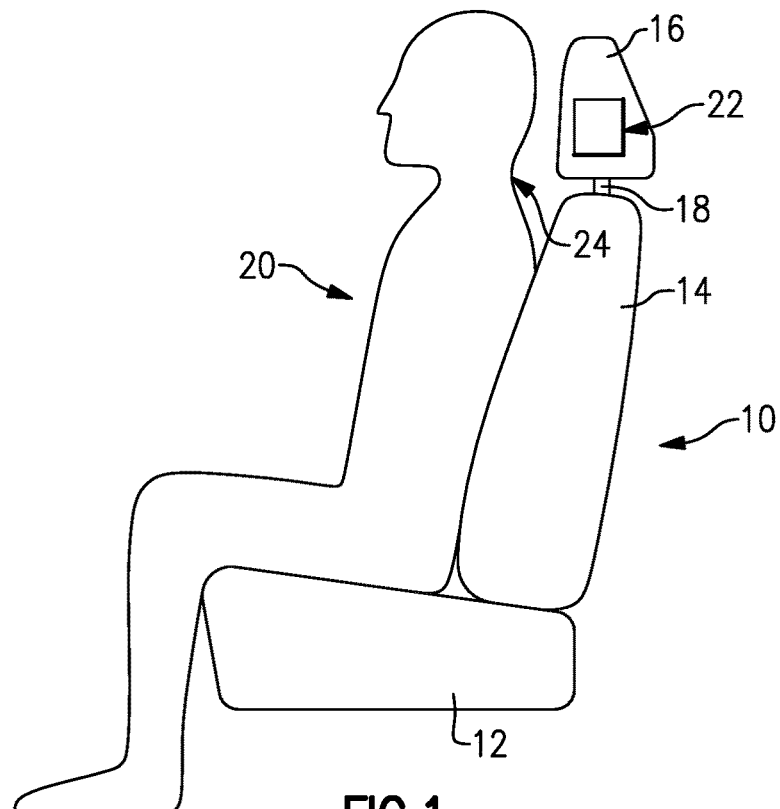
FIG. 1 schematically depicts an occupant in an example vehicle seat.

FIG. 1 illustrates an occupant 20 in a seat 10. The seat 10 includes a bottom 12 and a back 14. In the example, a headrest 16 is supported on the back 14 by posts 18. Although a discrete headrest 16 is shown in the example seat 10, it should be understood that the headrest 16 may be integrated with the back 14.

A thermal conditioning device 22 is arranged in a seat portion of the seat 10, such as the headrest 16. The thermal conditioning device 22 is configured to direct a conditioned air to a neck area 24 of the occupant 20. The neck area 24 may also include the head and upper back of the occupant 20.

Figure 2:
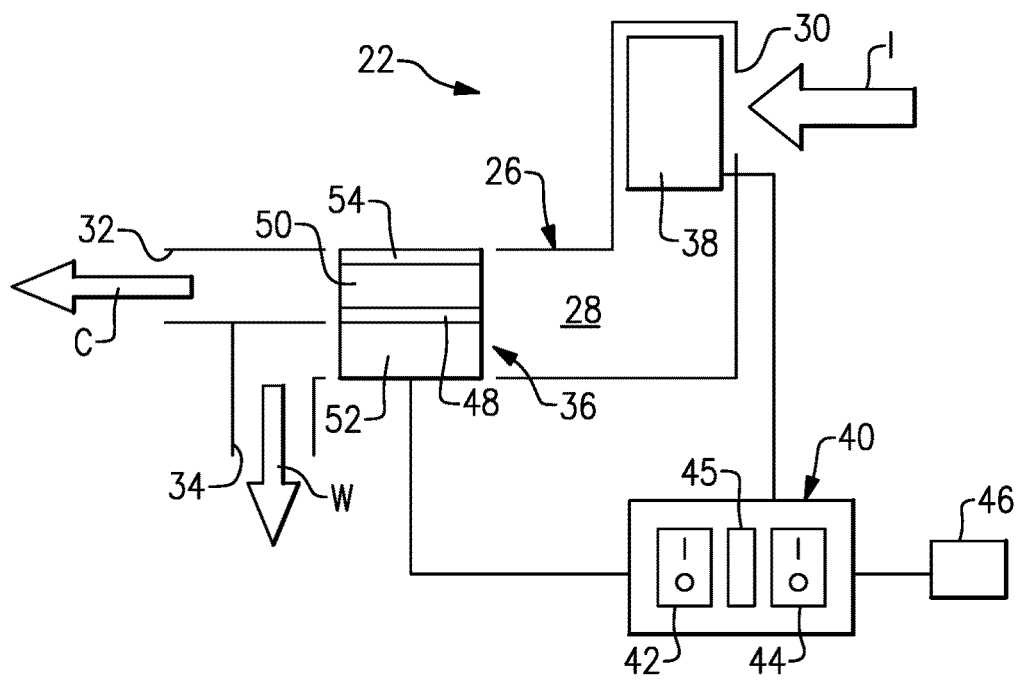
FIG. 2 is a schematic view of an example thermal conditioning device for a seat portion, such as a headrest.

A schematic view of an example thermal conditioning device 22 is illustrated in FIG. 2. The thermal conditioning device 22 includes a housing 26 providing a passage 28. The passage 28 communicates a supply air I from a fluid inlet 30 through a thermoelectric module 36 arranged in the passage 28 to first and second fluid outlets 32, 34, which are discrete from one another. A blower 38 is arranged in the passage 28 to move the fluids through the housing 26. The first fluid outlet 32 provides a conditioned air C to the neck area 24 of the occupant. The second fluid outlet 34 exhausts a waste air W in a direction away from the conditioned air C and the supply air I.

An input device 40 communicates with the thermoelectric module 36 and the blower 38 to selectively provide heating and cooling modes that respectively provide heated conditioned air and cooled conditioned air to the neck area 24. A power source 46 is connected to the thermoelectric module 36 and blower 38 and is operated by the input device 40. In one example, the input device 40 includes heating and cooling switches 42, 44, operated by the occupant 20 which respectively implement the heating and cooling modes, and a controller 45 that controls operation of the thermoelectric module 36 and the blower 38 based on inputs from the cooling switches 42, 44. The controller 45 may include a processor and non-transitory memory where computer readable code for controlling operation is stored. In various examples, the controller 45 is integrated within the bottom 12, the back 14, or the blower 38.

In terms of hardware architecture, such a controller can include a processor, memory, and one or more input and/or output (I/O) device interface(s) that are communicatively coupled via a local interface. The local interface can include, for example but not limited to, one or more buses and/or other wired or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

The controller may be a hardware device for executing software, particularly software stored in memory. The processor can be a custom made or commercially available processor, a central processing unit (CPU), an auxiliary processor among several processors associated with the controller, a semiconductor based microprocessor (in the form of a microchip or chip set) or generally any device for executing software instructions.

The memory can include any one or combination of volatile memory elements (e.g., random access memory (RAM, such as DRAM, SRAM, SDRAM, VRAM, etc.)) and/or nonvolatile memory elements (e.g., ROM, etc.). Moreover, the memory may incorporate electronic, magnetic, optical, and/or other types of storage media. The memory can also have a distributed architecture, where various components are situated remotely from one another, but can be accessed by the controller.

The software in the memory may include one or more separate programs, each of which includes an ordered listing of executable instructions for implementing logical functions. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory.

The input/output devices that may be coupled to system I/O Interface(s) may include input devices, for example, but not limited to, a scanner, microphone, camera, proximity device, etc. Further, the input/output devices may also include output devices, for example but not limited to a display, etc. Finally, the input/output devices may further include devices that communicate both as inputs and outputs, for instance but not limited to, a modulator/demodulator (for accessing another device, system, or network), a radio frequency (RF) or other transceiver, a bridge, a router, etc.

When the controller is in operation, the processor can be configured to execute software stored within the memory, to communicate data to and from the memory, and to generally control operations of the computing device pursuant to the software. Software in memory, in whole or in part, is read by the processor, perhaps buffered within the processor, and then executed.

The thermoelectric module 36 provides both heating and cooling. In one example, the thermoelectric module 36 includes a thermoelectric device 48 having a main heat exchanger 50 and a waste heat exchanger 52. The thermoelectric device 48 is configured to provide heating and cooling respectively in a heating mode and a cooling mode based upon a direction of current flow through the thermoelectric device 48. A heating element 54 is mounted to the main heat exchanger 50 to provide additional heating.

Referring to FIGS. 3A-3D, the headrest 16 includes a core 56 that is designed to absorb an impact from the occupant's head in the event of a vehicle crash. The core 56 (shown in phantom) is mounted to posts 18. The posts 18 may be omitted in seats where the headrest has been integrated into the back. A cushion member 58, typically foam, is wrapped about the core 56, and an aesthetic cover 60 is arranged about the cushion member 58.

Figure 3A:
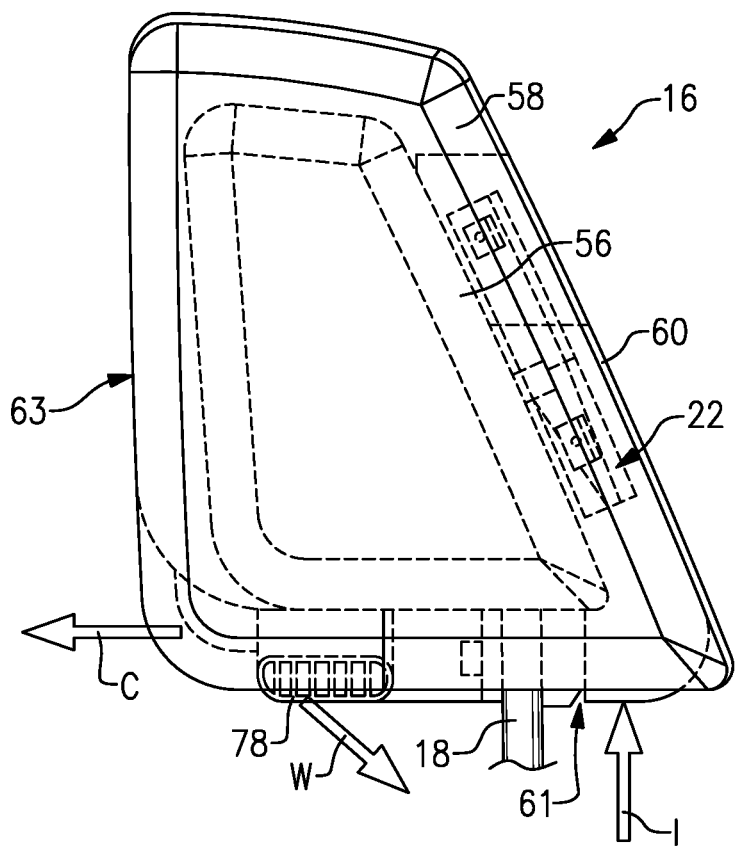
FIGS. 3A-3D illustrate various views of the headrest.
Figure 3B:
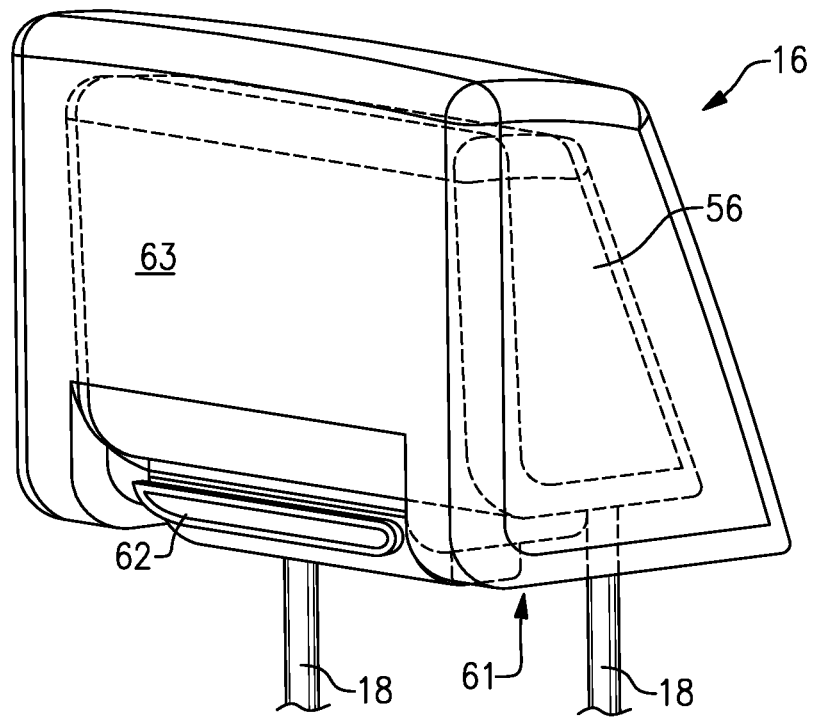

As best shown in FIG. 3B, a conditioned air vent 62 is provided in a head support surface 63 of the headrest 16. An exhaust vent 78, in the example, two exhaust vents, is provided in a bottom 61 of the headrest 16. The supply air I enters the bottom 61. The housing 26 is generally L-shaped and arranged at the bottom and rear of the headrest 16 adjacent the core 56.

Figure 3C:
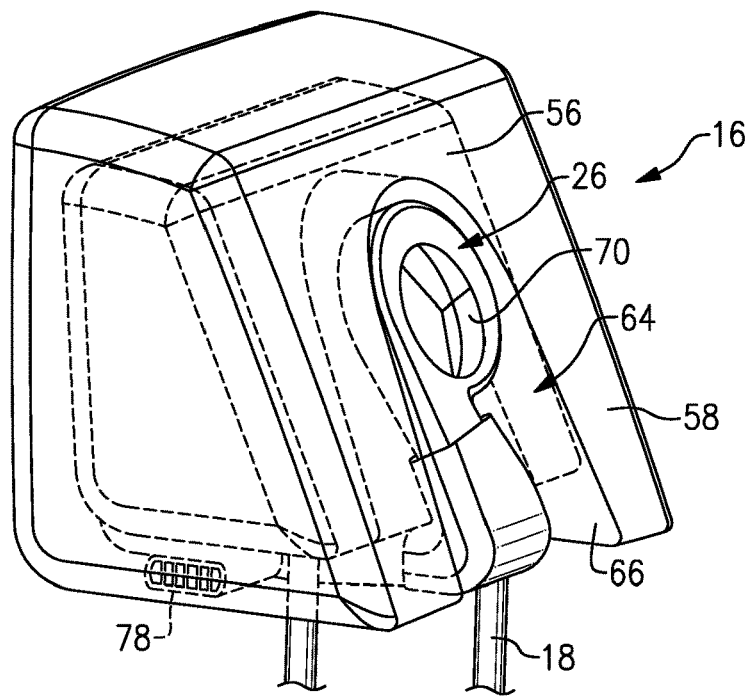
Figure 3D:
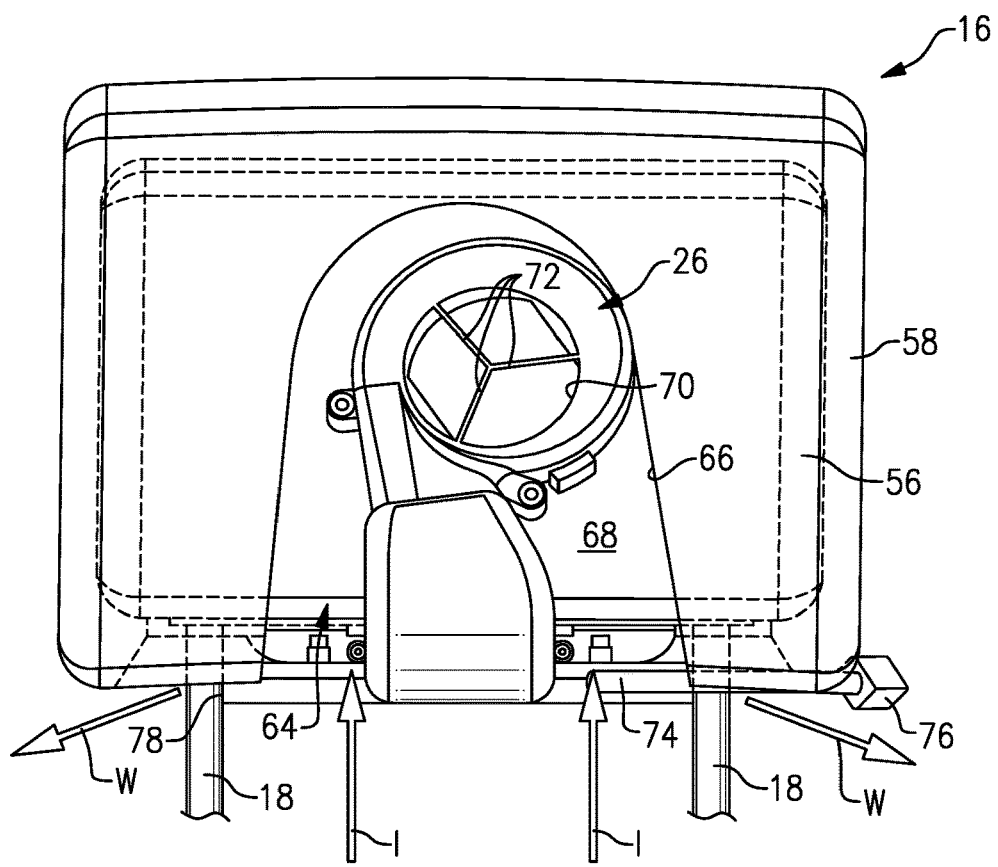

FIGS. 3C and 3D illustrate the headrest 16 with the aesthetic cover 60 removed exposing the cushion member 58. The cushion member 58 includes an aperture 64 that provides a perimeter 66 defining a cavity 68. A portion of the housing 26 is arranged within the aperture 64 and spaced from the perimeter 66 and the aesthetic cover 60 to permit the supply air I to flow into an opening 70 of the housing 26. Legs 72 may span the opening 70 to support the aesthetic cover 60 and prevent the aesthetic cover 60 from being forced into the opening 70 if deflected inward.

A pigtail 74 with a connector 76 supplies electric signals to the thermal conditioning device 22. In one example, at least one of the posts 18 is hollow, and the pigtail 74 is routed through the at least one of the posts 18 into the back 14.

Figure 4A:
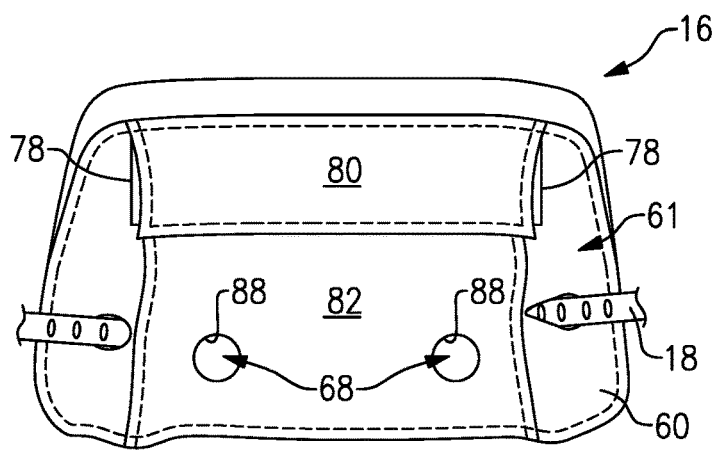
FIGS. 4A-4C illustrate first and second flaps of a headrest aesthetic cover with respect to an exhaust vent of the thermal conditioning device.
Figure 4B:
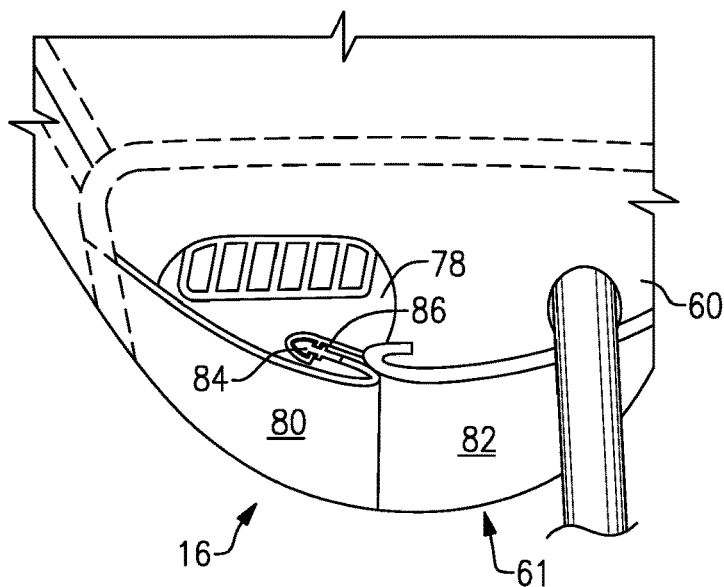
Figure 4C:
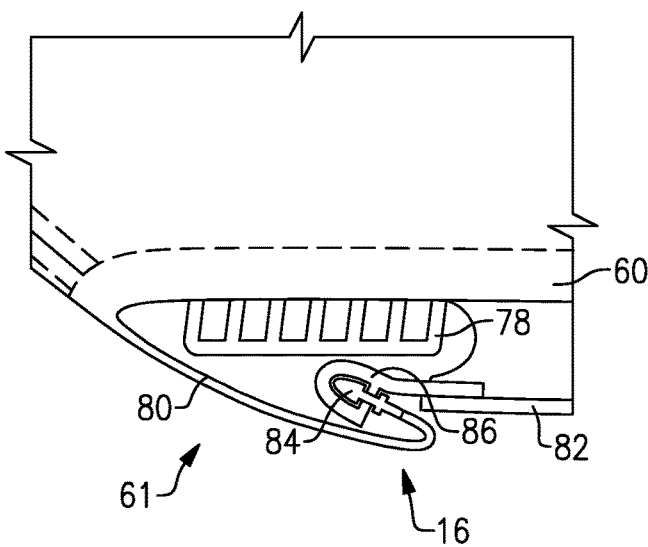
Figure 5A:
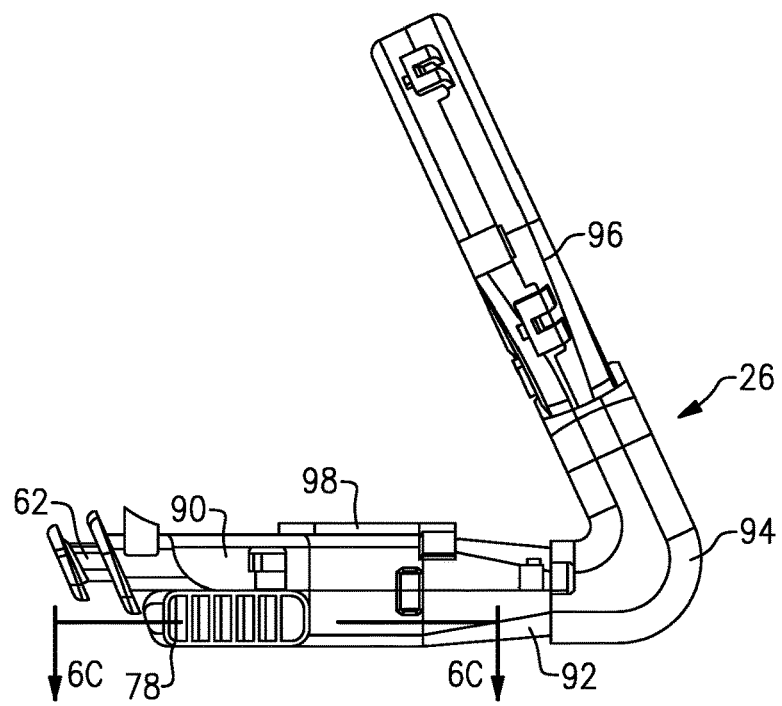
FIGS. 5A-5C illustrate a housing of the thermal conditioning device.
Figure 5B:
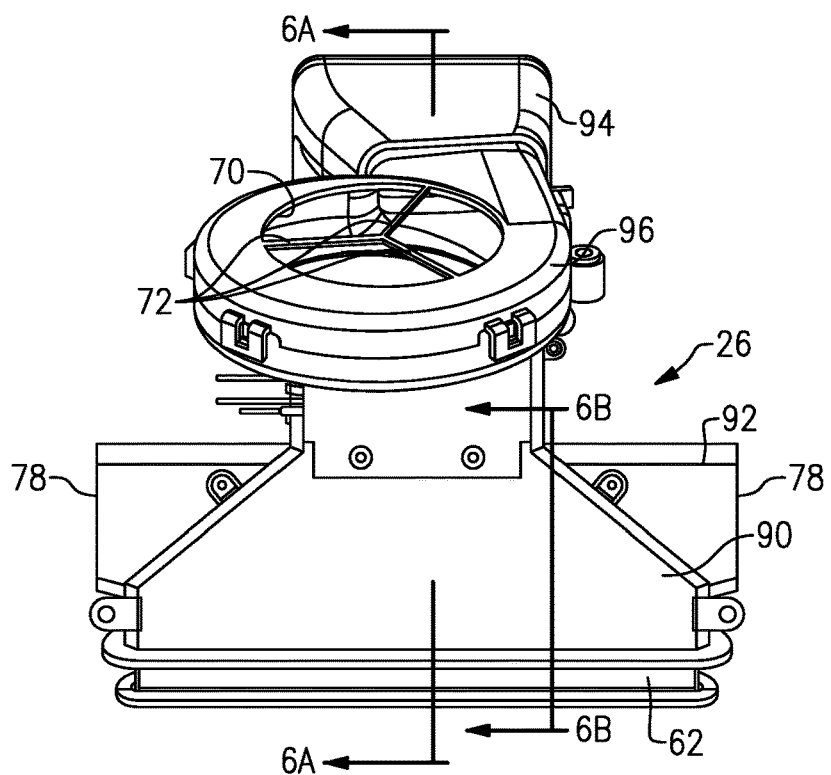
Figure 5C:
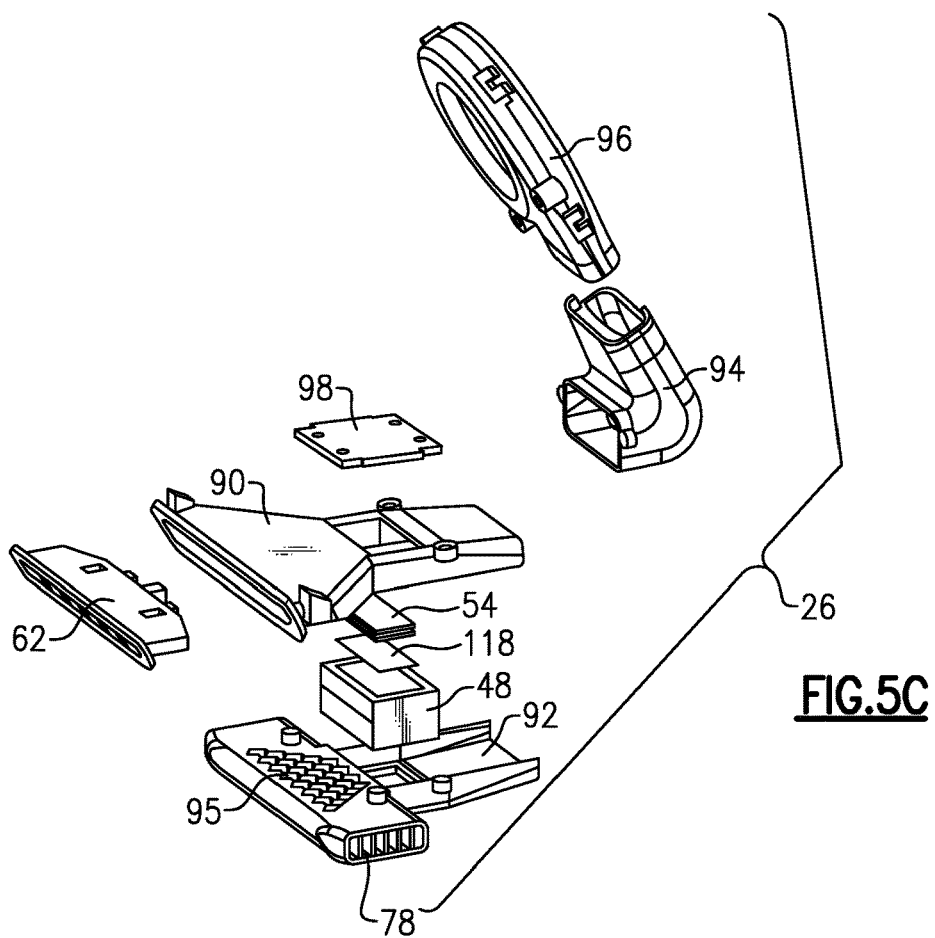

Referring to FIGS. 4A-4C, the bottom 61 of the headrest 16 is shown in more detail. One example aesthetic cover 60 includes first and second flaps 80, 82 joined to one another at the bottom 61 to provide a connecting seam. The first and second flaps 80, 82 respectively include first and second clips 84, 86 that cooperate with one another to secure the first and second flaps 80, 82 to one another and enclose the cores 56, cushion member 58 and thermal conditioning device 22. The exhaust vent 78 is arranged at lateral openings provided near the connecting seam of the first and second flaps 80, 82 such that the exhaust vents 78 slightly protrude or are at least partially exposed to exhaust waste air W generally unobstructed out the bottom 61.

In the example, holes 88 are provided in the second flap 82 to communicate the supply air I to the cavity 66. As a result, the back of the headrest 16 is more attractive to rear occupants of the vehicle. This also allows for padding to be placed on the back of the headrest, providing protection against rear occupant impact with the back of the headrest.

Referring to FIGS. 5A-6C, the housing 26 is shown in more detail. The housing 26, which may be plastic, is constructed from multiple portions, although it should be understood that the housing 26 may be constructed from fewer or a greater number of components than shown. The housing 26 includes first and second portions 90, 92 secured to one another. The conditioned air vent 62 is received in an opening in the first housing portion 90. The first and second housing portions 90, 92 are secured to one another about the thermoelectric module 36. A plate 98 is secured over the first housing portion 90 to facilitate insertion and removal of the heating element 54 relative to the housing 26. In an alternate example, the plate 98 is formed integral with the first housing portion 90. The second housing portion 92 provides the exhaust vent 78. An elbow 94 arranged at an acute angle fluidly connects the thermoelectric module 36 to a blower housing 96 that houses the blower 38, not shown for clarity. In the example, isolated depressions or concavities 95 formed in the second housing portion 92 provide an air space and thermal barrier inhibiting heat transfer between the first and second housing portions 90, 92.

Figure 6A:
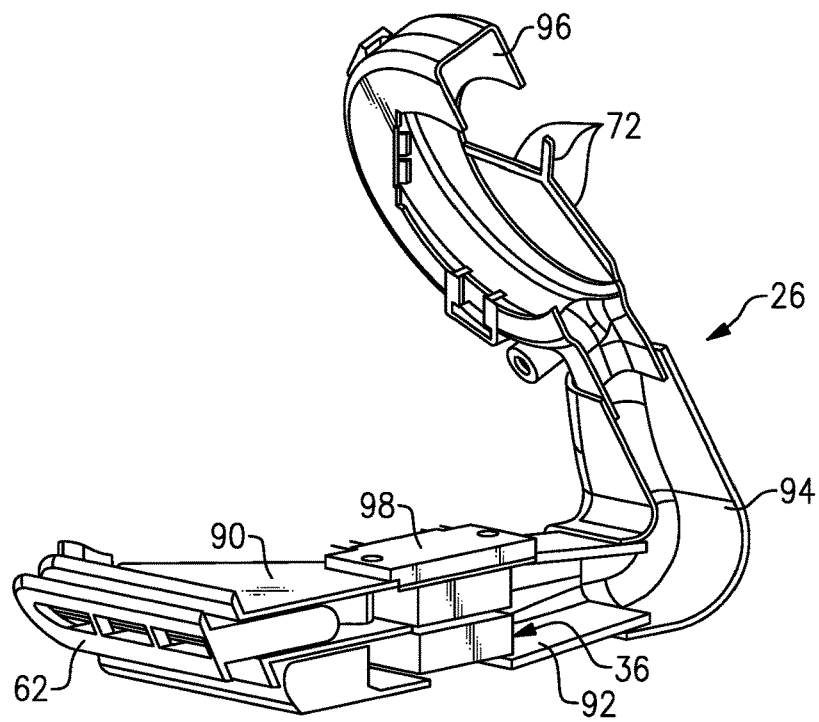
FIGS. 6A-6C depict cross-sections of the housing shown in FIGS. 5A-5C.
Figure 6B:
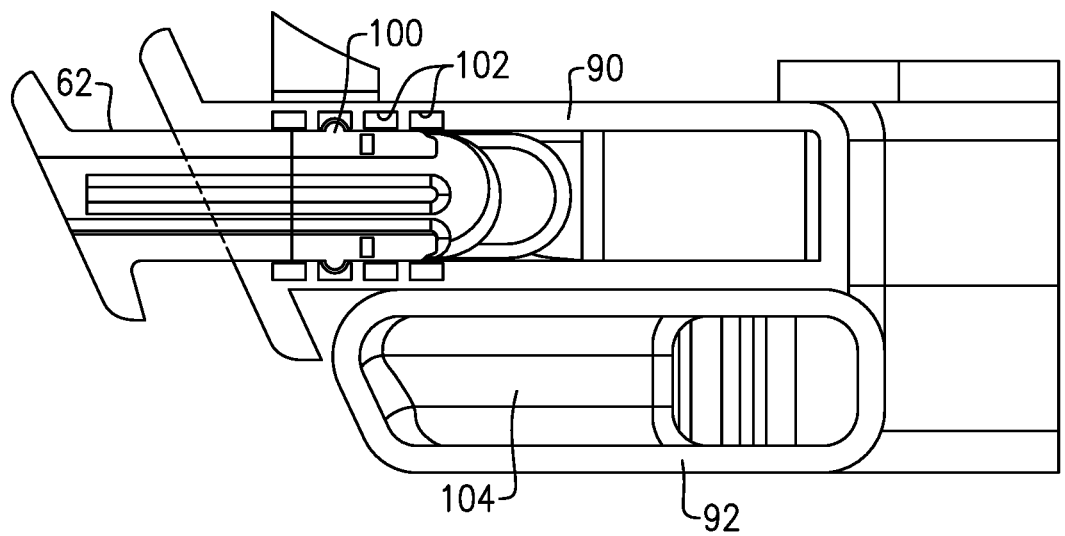
Figure 6C:
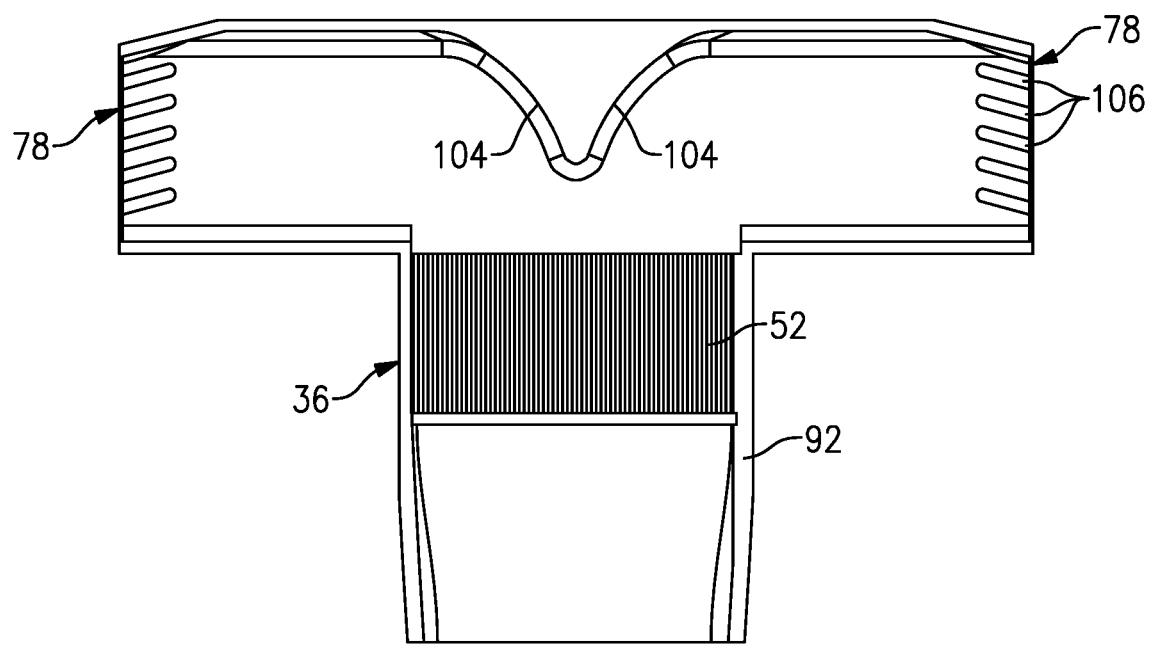

Referring to FIG. 6B, the conditioned air vent 62 is slidably received within the first housing portion 90 to facilitate assembly of the headrest 16. In the example, the conditioned air vent 62 includes a protrusion 100 that cooperates with one or more recesses 102 in the first housing portion 90 to retain the conditioned air vent 62 when installed into the headrest 16.

The second housing portion 92 includes a curved wall 104, which directs waste air W to the split, dual exhaust vents 78. The exhaust vent 78 include multiple angled dividers 106 canted aftward to direct the waste air W laterally and rearward away from the front of the headrest 16 and the occupant's neck area 24.

Figure 7A:
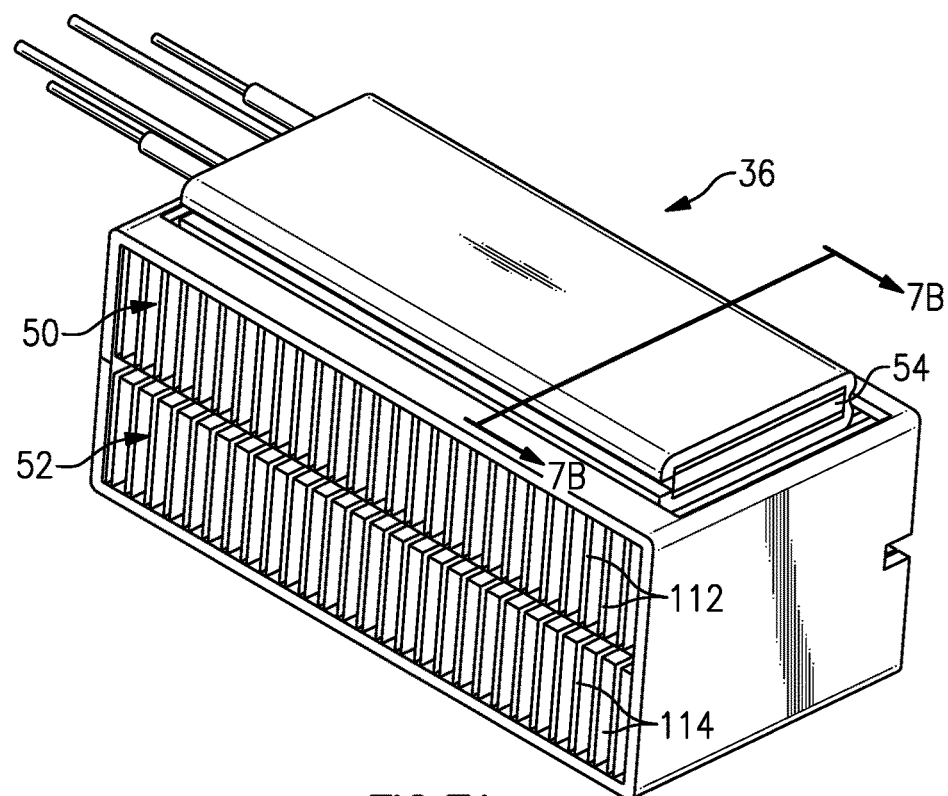
FIGS. 7A-7B illustrate views of an example thermoelectric module.
Figure 7B:
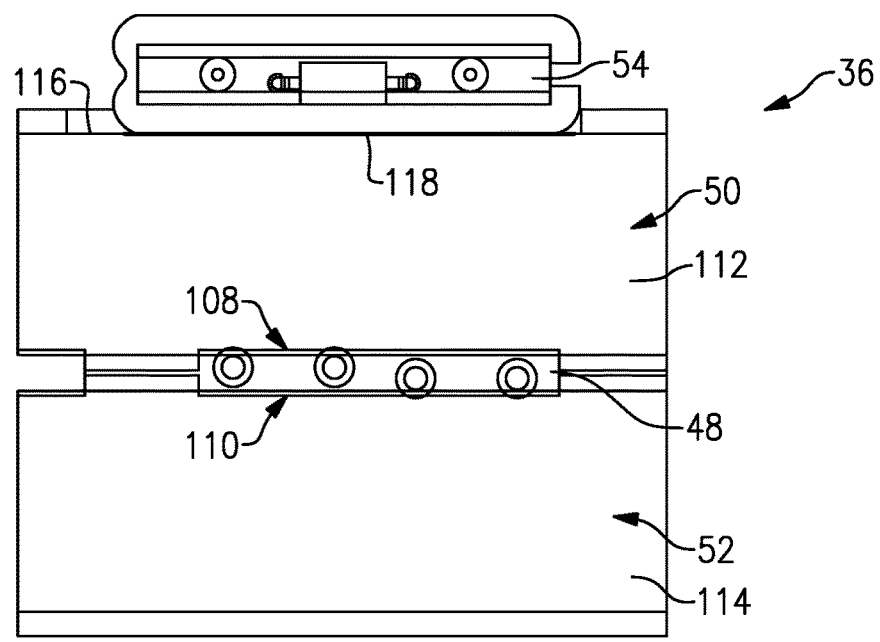

The thermoelectric module 36 is shown in more detail in FIGS. 7A and 7B. The thermoelectric device 48 includes a main side 108 and a waste side 110, which respectively support the main and waste heat exchangers 50, 52. In the example, the main heat exchanger 50 includes corrugated main fins 112, and the waste heat exchanger 52 includes corrugated waste fins 114. The fins may be constructed from a thin copper material. The main fins 112 include an edge 116 to which the heating element 54 is thermally coupled or mounted using a material 118. In one example, the material 118 may be a solder, and in another example, the material 118 may be a thermally conductive paste.

Figure 8:
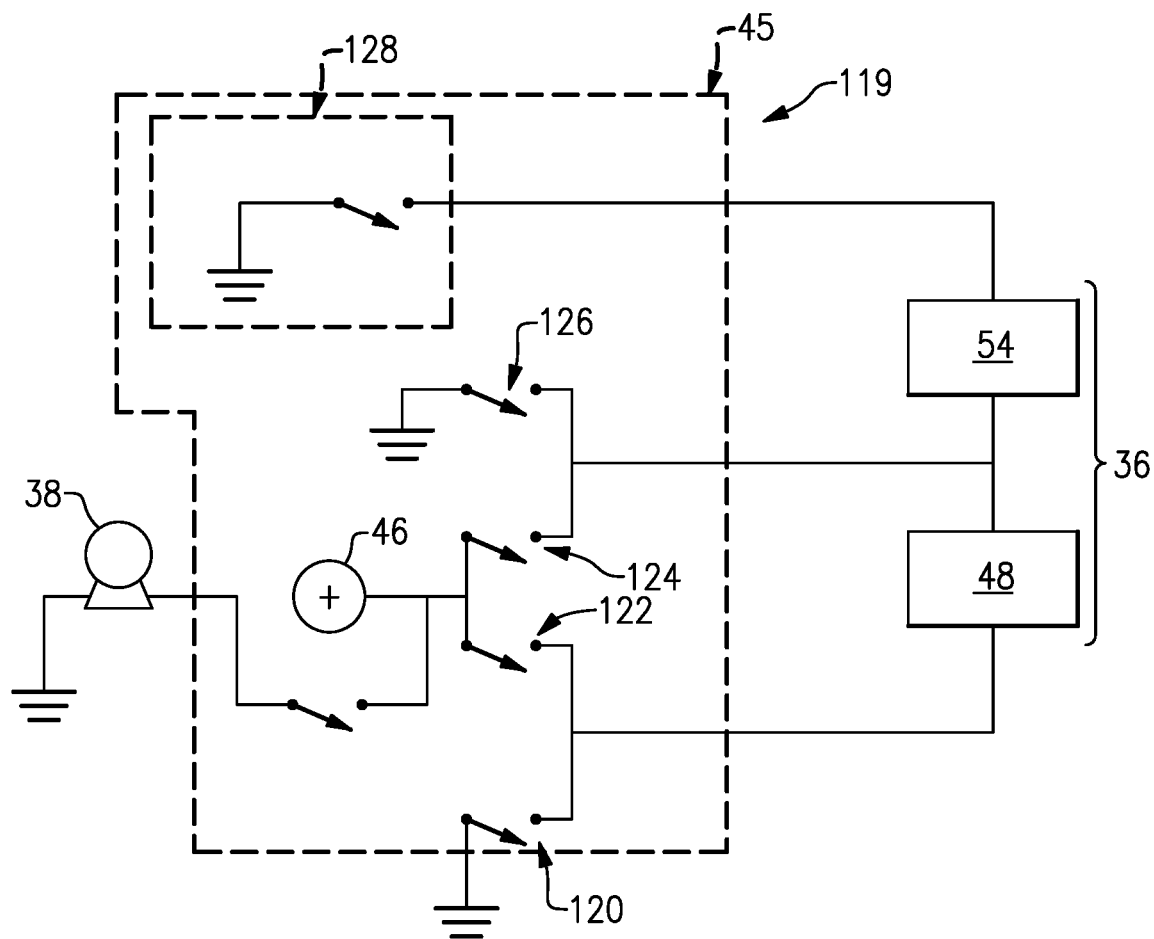
FIG. 8 is an example circuit schematic used to selectively actuate heating and cooling modes of the thermal conditioning device.

An example circuit 119 for powering the thermal conditioning device 22 is shown in FIG. 8. The circuit 119 includes first, second, third and fourth switches 120, 122, 124 and 126, which are incorporated into the heating and cooling switches 42, 44, the controller 45, or a combination thereof for example. In operation, in the cooling mode, first and third switches 120, 124 are "off" and second and fourth switches 122, 126 are "on." In this configuration, the heating element 54 is shorted out and the current flow through the thermoelectric device 48 provides cooling of the main heat exchanger 50 using the Peltier effect. The blower 38 is also powered either directly or controlled using additional circuits in the control module 45. The waste heat exchanger 52 is hot and provides warm waste air W.

In the heating mode, the first and third switches 120, 124 are "on" and the second and fourth switches 122, 126 are "off." In this configuration, the current flow through the thermoelectric device 48 is reversed to provide heating at the main heat exchanger 50. The heating element 54 is also powered such that heat is rejected from the heating element 54 to the main heat exchanger 50 as well. The blower 38 is also powered either directly or controlled using additional circuits in the control module 45. The waste heat exchanger 52 is cool and provides cool waste air W.

In one example, the heating element 54 is a positive temperature coefficient (PTC) heating element which self-regulates its temperature. If a resistive heating element is desired, a pulse width modulation (PWM) modulator 128 may be used to regulate the heating element 54.

In one example, the controller 45 is operably coupled to the power source 46 and the switches 120, 122, 124, 126, and independently controls an amount of power supplied by the power source 46 to the blower 38, the thermoelectric device 48, and the heating element 54.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A seat air moving device comprising:
    a seat portion that includes a vent configured to provide air to a seat occupant neck area, the seat portion including an aesthetic cover that provides an occupant support surface; and
    an air moving device configured to supply air, wherein the air moving device includes a housing that retains the aesthetic cover and provides the vent, the housing provides a passage including a fluid inlet and a first fluid outlet, and the first fluid outlet corresponds to the vent located in the occupant support surface and configured to provide the air to the seat occupant neck area.

2. The seat air moving device according to claim 1, wherein the housing provides a second fluid outlet, and the first fluid outlet provides the vent.

3. The seat air moving device according to claim 2, wherein a thermoelectric module is arranged in the passage between the fluid inlet and the first and second fluid outlets and configured to condition the air.

4. The seat air moving device according to claim 2, wherein the air moving device moves air from the fluid inlet through the thermoelectric module to the first and second fluid outlets.

5. The seat air moving device according to claim 3, wherein the first fluid outlet provides conditioned air to the seat occupant neck area, and the second fluid outlet is located in an area remote from the occupant support surface and configured to direct a waste air from the thermoelectric module away from the seat occupant neck area.

6. The seat air moving device according to claim 3, wherein the seat portion includes a core and a cushion member arranged about the core, the thermoelectric module is supported relative to the core, and an aesthetic cover wrapped about the core, the cushion member and the device.

7. A device for a climate controlled seat comprising:
    a housing that provides a passage including a fluid inlet and a fluid outlet;
    an air moving device located in the housing and configured to move fluid from the fluid inlet to the fluid outlet;
    wherein the fluid outlet is configured to be located at an occupant support surface and configured to provide air to a seat occupant neck area, wherein the fluid outlet includes a vent slidably received within the housing and is configured to retain an aesthetic cover between the vent and the housing.

8. The air moving device according to claim 7, wherein the passage is L-shaped, and the air moving device is arranged at one end of the passage.

9. The air moving device according to claim 8, wherein the fluid outlet is a first fluid outlet, and comprising a thermoelectric module arranged in the passage between the fluid inlet and the fluid outlet; and a second fluid outlet that is provided by laterally spaced apart exhaust vents that include dividers canted aftward and are configured to direct a waste air laterally and rearward away from the first fluid outlet.

10. The air moving device according to claim 8, wherein the fluid inlet and the fluid outlet are fluidly connected by an elbow that is bent at an acute angle.

11. The air moving device according to claim 9, wherein the housing is provided by first and second housing portions that separate the first and second fluid outlets from one another.

* * * * *